Aug. 25, 1925.

J. M. O'CONNOR 1,551,046

TUBE MANUFACTURE

Filed May 2, 1924

INVENTOR.
Jeremiah M. O'Connor
BY
ATTORNEY.

Patented Aug. 25, 1925.

1,551,046

UNITED STATES PATENT OFFICE.

JEREMIAH M. O'CONNOR, OF HOLYOKE, MASSACHUSETTS, ASSIGNOR TO THE FISK RUBBER COMPANY, OF CHICOPEE FALLS, MASSACHUSETTS, A CORPORATION OF MASSACHUSETTS.

TUBE MANUFACTURE.

Application filed May 2, 1924. Serial No. 710,524.

*To all whom it may concern:*

Be it known that I, JEREMIAH M. O'CONNOR, a citizen of the United States of America, residing at Holyoke, in the county of Hampden and State of Massachusetts, have invented certain new and useful Improvements in Tube Manufacture, of which the following is a specification.

This invention relates to a process for the manufacture of rubber tubes such as are used as inner tubes for automobile tires. It has long been recognized that these tubes, which are endless, had a somewhat improved appearance when vulcanized in the curved form which they are to assume in the tire; but the slight difference between small size tubes so vulcanized and those cured on straight mandrels, as well as the high cost and great bulk of circular mandrels or annular molds for treating the tubes in this manner, has prevented the general adoption of this process. The recent advent of the so-called balloon tires of large cross-section has required the production of tubes whose dimensions make it imperative that they be vulcanized in annular form. My present invention has for its object a process of tube manufacture by which tubes can be produced having the characteristics of those formerly cured on curved mandrels or in annular molds, but without the expense of equipment and operation incident to those earlier processes.

Referring now to the drawings.

Figure 1:
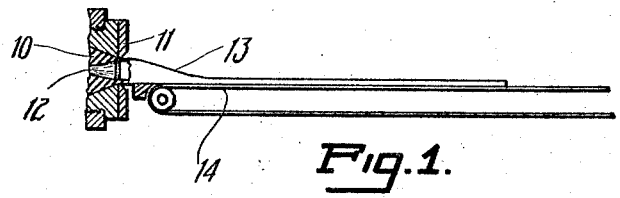
Fig. 1 is a diagrammatic detail showing one way of forming the tubing out of which the annular tube is made.

The general plan of my invention consists in forming an endless tube of unvulcanized rubber and vulcanizing the tube while supported in substantially flattened condition on a conical surface of suitable dimensions. By giving the vulcanization in this manner the annular tube is cured in the form of a conical frustum. The proportions of this frustum are determined by choosing the proper size and angle of the conical supporting surface so that the smaller and greater diameters of the frustum correspond approximately to the inner and outer diameters of the inflated tube respectively. On inflation a tube so constructed will shape itself smoothly into a torus of the required size. The process thus generally described may be varied in its details according to the requirements or preferences of the tube builder, some of the variations being pointed out below.

The tubular material from which the annulus is to be made is preferably formed by extruding a mass of rubber 10 through the die 11 of a tubing machine such as is commonly used in rubber manufacture, the internal mandrel of the machine being indicated at 12. The tube 13, which immediately sags to a flattened form, is received on a conveyor 14 and may by this means be produced in a continuous length from which pieces of the required size may be cut. As this tube is formed, powdered soapstone, or other adhesion preventing substance, is introduced into its interior so that it may be handled in its flattened or collapsed form. The tubing thus formed is now cut to the length desired, which is preferably that of the circumference corresponding to the smaller diameter of the completed annular tube with sufficient additional allowance for splicing. One end of the tube is folded back on itself as indicated by 15 in Fig. 2 and the valve pad 16 adhesively secured in place. The tube may now again be straightened out and the valve 17 inserted.

Figure 3:
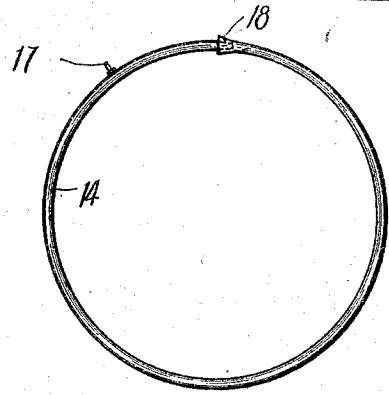
Fig. 3 is a view illustrative of the formation of the annular tube from the tubing so prepared.
Figure 4:
Fig. 4 is a perspective view of a conical support used during vulcanization.
Figure 5:
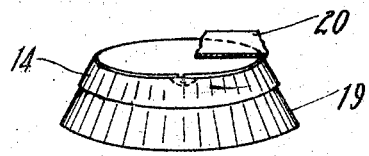
Fig. 5 is a view illustrative of the vulcanizing step.

The tube is now ready, in the preferred form of the method, for splicing in endless form. Since it is uncured all that is necessary is to lap the ends as indicated at 18 in Fig. 3 and roll the overlapped portions firmly together, the soapstone being first wiped, preferably with a rubber solvent, off the portions to be joined. The annular tube thus formed is now stretched upon the surface of a cone 19 conveniently formed of sheet metal. As the valve is to be located at the smaller circumference of the finished tube it is placed at the top of the cone. After the tube is stretched into place it is preferably bound lightly with fabric, or otherwise secured so that the elasticity of the rubber before vulcanization will not cause the tube to rise on the cone, or sagging of the rubber during the heat cause it to stretch further down. Or the tube may be held down on the cone by a plate 20, shown fragmentarily in Fig. 5, which rests on the cone during the cure. The tube is vulcanized while so supported by placing it in an atmosphere of steam or other heating medium, curing in one operation the body of the tube and the joint.

Figure 2:
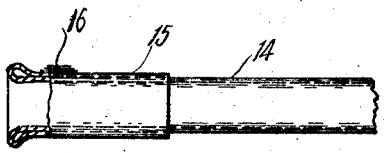
Fig. 2 is a detail illustrating one way of applying a valve pad.
Figure 6:
Fig. 6 is a view of an optional preliminary treatment.
Figure 7:
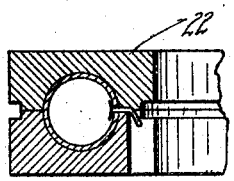
Fig. 7 is a detail of another optional preliminary treatment.

A tube thus cured will have its outer surface in the dull or slightly roughened condition in which it is formed by the tubing machine. While this is no detriment to the tube, it may be desired in some cases to give the tube a smooth exterior similar to those tubes cured on mandrels. In Figs. 6 and 7 I have shown two modifications of the process by which this result may be secured. According to the modification of Fig. 6 the tube, formed as in Figs. 1 and 2, is placed upon a mandrel 21 and given a slight set in an atmosphere of steam under pressure. A heating period of under five minutes will in most cases be found sufficient to impart to the rubber the smooth finish of the mandrel. The tube is now stripped from the mandrel and turned inside out, bringing the smooth surface of the tube outermost, and the ends of the tube spliced in any way suitable for partly vulcanized stock, a vulcanizable cement being generally used. The tube thus partially cured on a straight mandrel and joined into an annular tube is placed upon the cone 19 and given its main and final vulcanization in the same manner as the tube of the preferred method. A tube so treated loses its character as a tube made on a straight mandrel, except as to its smooth surface, and takes a shape of a tube cured in curved form.

The second modified method is illustrated in Fig. 7. In this case the tube is made endless in the same way as the tube shown in Fig. 3 but is given a partial cure while inflated in a split annular mold 22 before being placed on the cone 19. This smooths the outer surface of the tube and forms the tube in true circular shape. This modification of the invention produces tubes of the same character as tubes given a complete cure in the annular mold, but avoids the use for long cures of the expensive and bulky molds, doing the forming and smoothing only in the mold and giving the long cure necessary to completely vulcanize the rubber while on the inexpensive and easily stacked cones 19.

Having thus described my invention, I claim:

1. A method of making annular tubes in which they are vulcanized while supported upon a conical surface.

2. A method of making annular tubes in which they are formed straight, stretched upon and supported by a conical surface, and subjected to a vulcanizing heat while so supported.

3. A method of making annular tubes in which they are given a smoothing heat while in contact with a molding surface, stretched upon and supported by a conical surface, and subjected to a vulcanizing heat while so supported.

4. A method of making annular tubes in which they are made endless while substantially unvulcanized and subjected to a vulcanizing heat while supported in flattened condition on a conical surface.

JEREMIAH M. O'CONNOR.